US012711502B2

(12) United States Patent
Cantwell et al.

(10) Patent No.: US 12,711,502 B2
(45) Date of Patent: Aug. 18, 2026

(54) SYSTEMS AND METHODS FOR COMPUTER MESSAGE CONVERSION AND VALIDATION

(71) Applicant: MASTERCARD INTERNATIONAL INCORPORATED, Purchase, NY (US)

(72) Inventors: Jay P. Cantwell, Saint Charles, MO (US); Chandrasekhar R. Gummi, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/619,878

(22) Filed: Mar. 28, 2024

(65) Prior Publication Data

US 2024/0242210 A1 Jul. 18, 2024

Related U.S. Application Data

(63) Continuation of application No. 14/691,296, filed on Apr. 20, 2015, now abandoned.

(51) Int. Cl.
*H04L 69/08* (2022.01)
*G06Q 20/40* (2012.01)
*G06Q 20/38* (2012.01)

(52) U.S. Cl.
CPC ........... *G06Q 20/401* (2013.01); *H04L 69/08* (2013.01); *G06Q 20/38* (2013.01); *G06Q 20/386* (2020.05)

(58) Field of Classification Search
CPC .... G06Q 20/401; G06Q 20/38; G06Q 20/386; H04L 69/08
See application file for complete search history.

(56) References Cited

U.S. PATENT DOCUMENTS 6,032,147 A 2/2000 Williams et al.
6,778,651 B1 8/2004 Jost et al.
7,019,558 B1 3/2006 Jacobson et al.
7,058,082 B1 6/2006 Bhat et al.
7,072,898 B2 7/2006 Bussler et al.
7,099,949 B1 8/2006 Vanhoof et al.
7,529,269 B1 5/2009 Bhat et al.
7,562,352 B2 7/2009 Yamada et al.
8,069,289 B2 11/2011 Hafer et al.
8,069,435 B1 11/2011 Lai
8,291,099 B2 10/2012 Hadland
(Continued)

*Primary Examiner* — Hao Fu
(74) *Attorney, Agent, or Firm* — Armstrong Teasdale LLP

(57) ABSTRACT

A computer-implemented method for validating and converting a data message is provided. The method is implemented using a data message validation and conversion (DMVC) computer device in communication with a memory. The method includes receiving from a client device a first data message in a first communication protocol. The first data message includes a plurality of data elements that include a format and a content. The method also includes converting the first data message into a second communication protocol, determining if the format and the content of each data element of the plurality of data elements is valid, if the determination is that at least one of the format and the content of at least one data element is not valid, generating a detailed report about the first data message and providing the detailed report to the client device, and otherwise transmitting the converted first data message.

20 Claims, 8 Drawing Sheets

(56) References Cited

U.S. PATENT DOCUMENTS 8,302,081 B2 10/2012 Yamada et al.
8,510,478 B2 8/2013 Harrand
8,819,105 B2 8/2014 Li et al.
8,838,737 B2 * 9/2014 Eisner .................... G06Q 30/00 709/217
2003/0225913 A1 12/2003 Bussler et al.
2009/0254603 A1 * 10/2009 Duncan ................... G06F 21/64 709/203
2010/0077093 A1 3/2010 Hadland
2013/0159447 A1 * 6/2013 Wei ..................... H04L 41/0886 709/224
2014/0115121 A1 4/2014 Almadi et al.
2016/0092857 A1 * 3/2016 Amos ................ G06Q 20/0855 705/39

* cited by examiner

SYSTEMS AND METHODS FOR COMPUTER MESSAGE CONVERSION AND VALIDATION

CROSS REFERENCE TO RELATED APPLICATIONS

This application is a continuation of and claims priority to U.S. patent application Ser. No. 14/691,296 filed Apr. 20, 2015, the disclosure of which is hereby incorporated by reference in its entirety.

BACKGROUND OF THE DISCLOSURE

The field of the disclosure relates generally to data messages, and more specifically to methods and systems for validating and converting data messages between communication protocols.

Computer networks include numerous computing devices that send messages from one computing device to another. These data messages include multiple data fields, with each data field including at least one data element. In at least some cases, these data messages must follow a formal communication protocol or format so that the data elements within the data message can be understood by the computing device receiving the data message. In some additional cases, different computer networks communicate through different communication protocols, requiring conversion from one communication protocol to another to allow computing devices from different computer networks to communicate with each other.

Converting from one communication protocol to another protocol so that computer devices on different computer networks are able to communicate with one another is time consuming and oftentimes requires specialized computer training. It would be advantageous to have a system and method configured to easily allow computer devices operating under different communication protocols to be able to validate and convert messages for transmitting between the different communication protocols without requiring users with significant expertise.

BRIEF DESCRIPTION OF THE DISCLOSURE

In one aspect, a computer-implemented method for validating and converting a data message is provided. The method is implemented using a data message validation and conversion (DMVC) computer device in communication with a memory. The method includes receiving from a client computer device a first data message in a first communication protocol. The first data message includes a plurality of data elements, where each data element of the plurality of data elements includes a format and a content. The first data message also includes at least one setting option. The method also includes converting by the DMVC computer device the first data message into a second communication protocol based on the at least one setting option, determining by the DMVC computer device if the format and the content of each data element of the plurality of data elements is valid, if the determination is that at least one of the format and the content of at least one data element is not valid, generating a detailed report about the first data message and providing the detailed report to the client computer device, and if the determination is that the format and the content of the plurality of data elements is valid, transmitting the converted first data message to a destination based on the at least one setting option.

In another aspect, a data message validation and conversion (DMVC) computer device used to validate and convert data messages is provided. The DMVC computer device includes a processor communicatively coupled to a memory device. The processor is programmed to receive from a client computer device a first data message in a first communication protocol. The first data message includes a plurality of data elements, where each data element of the plurality of data elements includes a format and a content. The first data message also includes at least one setting option. The processor is also programmed to convert the first data message into a second communication protocol based on the at least one setting option, determine if the format and the content of each data element of the plurality of data elements is valid, if the determination is that at least one of the format and the content of at least one data element is not valid, generate a detailed report about the first data message and provide the detailed report to the client computer device, and if the determination is that the format and the content of the plurality of data elements is valid, transmit the converted first data message to a destination based on the at least one setting option.

In a further aspect, at least one non-transitory computer-readable storage media having computer-executable instructions embodied thereon is provided. When executed by a data message validation and conversion (DMVC) computer device having at least one processor coupled to at least one memory device, the computer-executable instructions cause the processor to receive from a client computer device a first data message in a first communication protocol. The first data message includes a plurality of data elements, where each data element of the plurality of data elements includes a format and a content. The first data message also includes at least one setting option. The computer-executable instructions also cause the processor to convert the first data message into a second communication protocol based on the at least one setting option, determine if the format and the content of each data element of the plurality of data elements is valid, if the determination is that at least one of the format and the content of at least one data element is not valid, generate a detailed report about the first data message and provide the detailed report to the client computer device, and if the determination is that the format and the content of the plurality of data elements is valid, transmit the converted first data message to a destination based on the at least one setting option.

BRIEF DESCRIPTION OF THE DRAWINGS

FIGS. 1-7 show example embodiments of the methods and systems described herein.

FIG. 1 is a schematic diagram illustrating an example multi-party transaction card industry system for enabling payment-by-card transactions in which merchants and card issuers do not need to have a one-to-one special relationship.

FIG. 2 is a simplified block diagram of an example system used for validating and converting data messages between communication methods in accordance with one example embodiment of the present disclosure.

FIG. 3 illustrates an example configuration of a client system shown in FIG. 2, in accordance with one embodiment of the present disclosure.

FIG. 4 illustrates an example configuration of a server system shown in FIG. 2, in accordance with one embodiment of the present disclosure FIG. 5 is a graphical representation of an example data message transmitted and received in the system as shown in FIG. 2.

FIG. 7 is a diagram of components of one or more example computing devices that may be used in system shown in FIG. 2.

Figure 1:
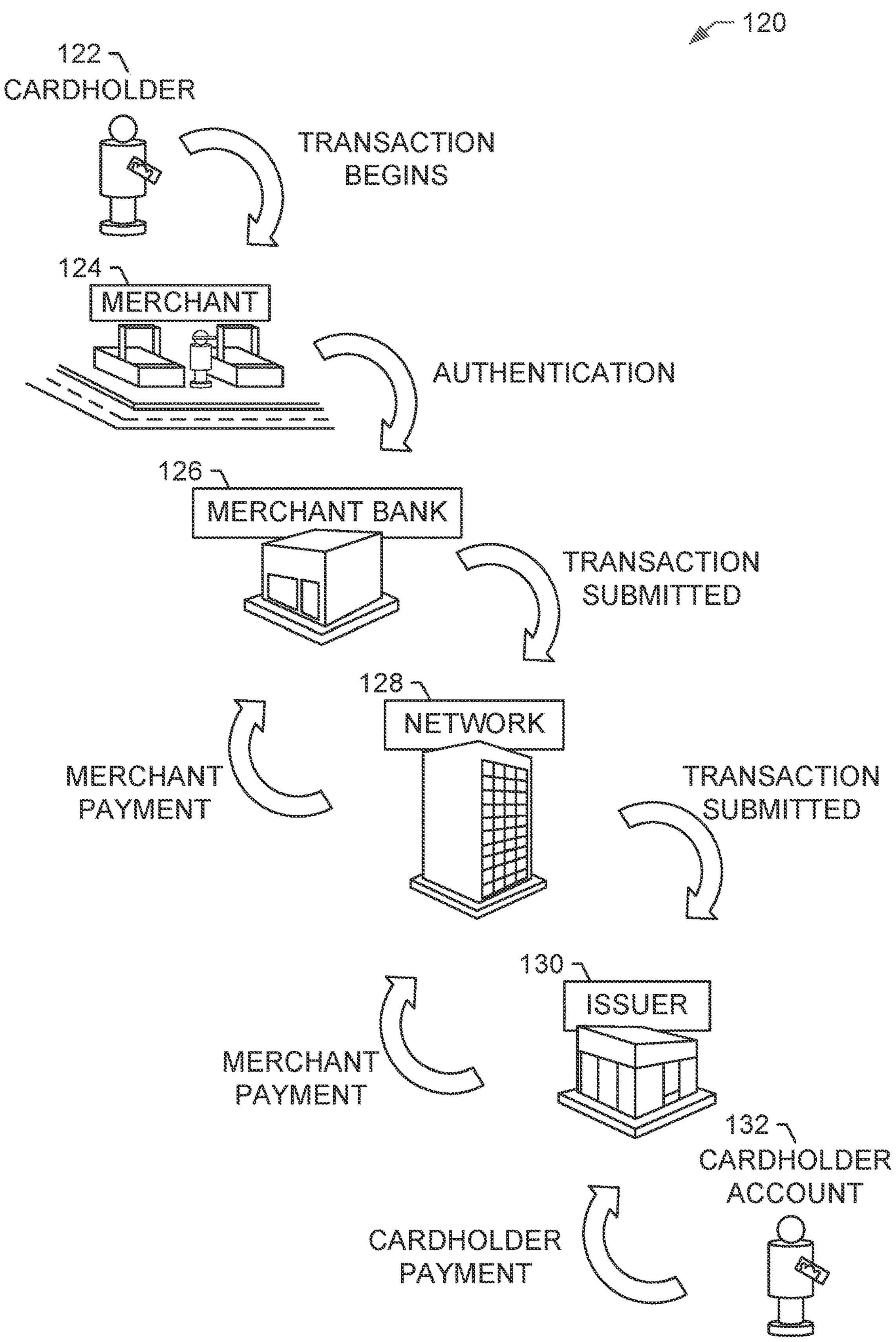

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

Acquiring banks may transmit messages, such as authorization request messages, to payment processing networks. These authorization request messages may contain a plurality of data elements. The data elements may include sub-elements and each sub-element may contain sub-fields. Each data element, sub-element, and sub-field may have their own format and range of allowable content. Additionally, many of the data elements are interconnected based on dependencies, where the content of one data element dictates the content of a different data element. If the data elements are not setup and filled in correctly, then the payment processing network responds by notifying the acquiring bank that the message failed. Debugging the failed message to determine which data element(s) were rejected and why is typically done manually and can be a very time-consuming process. For example, the response from the payment processing network about the failed message may include a three digit code, which requires the user debugging the message to look-up the three digit code. The code may point out that a specific field is incorrectly formatted. However, if the error is in a sub-field or sub-element, the response may not indicate where or how the field is incorrectly formatted.

In addition, some acquiring banks receive messages, such as the aforementioned authorization request message, in one communication protocol and have to convert the message into a different communication protocol for communication with the payment processing network.

The system and method described herein includes a data message validation and conversion (DMVC) computer device. The DMVC computer device (1) receives a data message in a communication protocol; (2) converts the data message to a different communication protocol; (3) determines if the converted data message is valid; (4) if the data message is determined to be valid, then the DMVC computer device transmits the converted data message; and (5) if the data message is determined to be invalid, the DMVC computer device generates a detailed report about the data message and transmits the detailed report to the originating computer device. In the example embodiment, acquiring banks transmit data messages such as an authorization request message to a payment processing network. The payment processing network requires the data to be transmitted in a particular communication protocol, while the acquiring banks may receive the data for the authorization request message in a different communication protocol.

In the example embodiment, the DMVC computer device receives a data message from a client computer device associated with an acquiring bank. For example, the data message may be an authorization request message. The data message is in a first communication protocol. The DMVC computer device converts the data message to a second communication protocol. In other embodiments, the first and second communication protocols may include, but are not limited to, American Standard Code for Information Interchange (ASCII), Web Services Description Language Extensible Markup Language (WSDL XML), Extended Binary Coded Decimal Interchange Code (EBCDIC) Binary, HyperText Markup Language (HTML), and JavaScript Object Notation (JSON). The DMVC computer device determines if the data message is valid by comparing the format and the content of the data elements in the data message to rules for proper format and content stored in a database. If the DMVC computer device determines that the data message is valid, then the DMVC computer device transmits the converted data message to the payment processing network or back to the client system for consumption. If the DMVC computer device determines that at least one data element of the data message is invalid, then the DMVC computer device generates a detailed report including reasons that why the data message is invalid. In the detailed report, the DMVC computer device describes each data field (or data element), sub-element, and sub-field that is invalid in the message. The detailed report includes verbose details about the affects data elements, sub-elements, and subfields. The DMVC computer device transmits the report to the client computer device that originated the data message.

In the example embodiment, the data message includes setting options. These setting options instruct the DMVC computer device on how to handle the data message. In the example embodiment, the setting options include the communication protocol that the data message is received in, the communication protocol that the data message is to be converted to, and where the converted and validated data message is to be transmitted to. In one example, the DMVC computer device may determine from the setting options that the data message is in WSDL XML, that the data message is to be converted to EBCDIC, and to be transmitted to the payment processing network. In another example, the DMVC computer device may determine from the setting options that the data message is in EBCDIC, is not to be converted, and will be returned to the computer that the data message was received from. In some other embodiments, the setting options may indicate that the data message only contains a subset of data elements of a complete authorization request message for validation, and possibly conversion, by the DMVC computer device.

In other embodiments where the DMVC transmitted the converted data message to the payment processing network, the DMVC computer device receives a reply data message from the payment processing network. The DMVC computer device converts the reply data message to the communication protocol in which the DMVC computer device received the original data message from the client computer device, or a different communication protocol if indicated by the setting options. The DMVC computer device transmits the reply data message to the client computer device from which the original data message was received from.

In some other embodiments, the DMVC computer device receives the data message in a first communication protocol from a client computer device. The DMVC computer device converts the data message to a different communication protocol. The DMVC computer device validates the converted data message. The DMVC computer device transmits the converted data message to the client computer device. In some embodiments, the DMVC computer device also generates and transmits a report about the conversion and validation of the data message to the client computer device.

In some embodiments, the DMVC computer device is configured to receive individual data elements or data fields for validation. For example, the DMVC computer device may receive, from the client computer device, a data message containing a single data element and information indicating where in an authorization request message the data element is located. The DMVC computer device uses the stored rules about the proper format and content for that data element to validate the received data element. The DMVC computer device generates a detailed and verbose report about the format and the content of the data element and returns the detailed verbose report to the client computer device.

The methods and systems described herein may be implemented using computer programming or engineering techniques including computer software, firmware, hardware, or any combination or subset. As disclosed above, at least one technical problem with known systems is it is difficult and time consuming to test individual data elements of a long data message with many interconnected data elements. The systems and methods described herein address that technical problem. The technical effect of the systems and processes described herein is achieved by performing at least one of the following steps: (a) receiving, from a client computer device, a first data message in a first communication protocol, wherein the first data message includes a plurality of data elements, wherein each data element of the plurality of data elements includes a format and a content, and wherein the first data message includes at least one setting option; (b) converting, by the DMVC computer device, the first data message into a second communication protocol based on the at least one setting option; (c) determining, by the DMVC computer device, if the format and the content of each data element of the plurality of data elements is valid, by (1) storing a plurality of format and content information for a plurality of potential data elements; (2) comparing each data element in the first message to the plurality of format and content information to determine if the format and the content of the corresponding data element is valid; and (3) for each data element where at least one of the format and the content is determined to be not valid, marking the corresponding data element as invalid; (d) if the determination is that at least one of the format and the content of at least one data element is not valid, (1) generating a detailed report about the first data message by (i) for each data element marked as invalid, determining one or more errors in at least one of the format and the content of the corresponding data element; (ii) for each data element marked as invalid, determining a proper format and content for the corresponding data element; and (iii) generating the detailed report based on the one or more errors and the proper format and content for each data element marked as invalid, and (2) providing the detailed report to the client computer device; and (e) if the determination is that the format and the content of the plurality of data elements is valid, (1) transmitting the converted first data message to a destination based on the at least one setting option, wherein the destination is a payment processing network, and wherein the second communication protocol allows communication between the DMVC computer device and the payment processing network (2) receiving, from the payment processing network, a second data message in response to the first data message, wherein the second data message is in the second communication protocol; (3) converting, by the DMVC computer device, the second data message into the first communication protocol; and (4) transmitting, to the client computer device, the converted second data message. The resulting technical effect is that the time to debug the data elements of a data message is reduced. An additional technical effect is that data messages are converted to setup communication with payment processing networks more quickly.

Described herein are computer systems such as DMVC computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to validating and converting data messages between communication methods.

FIG. 1 is a schematic diagram illustrating an example multi-party transaction card industry system 120 for enabling payment-by-card transactions in which merchants 124 and card issuers 130 do not need to have a one-to-one special relationship. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, New York).

In a typical transaction card system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128 (also known as a payment network), computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
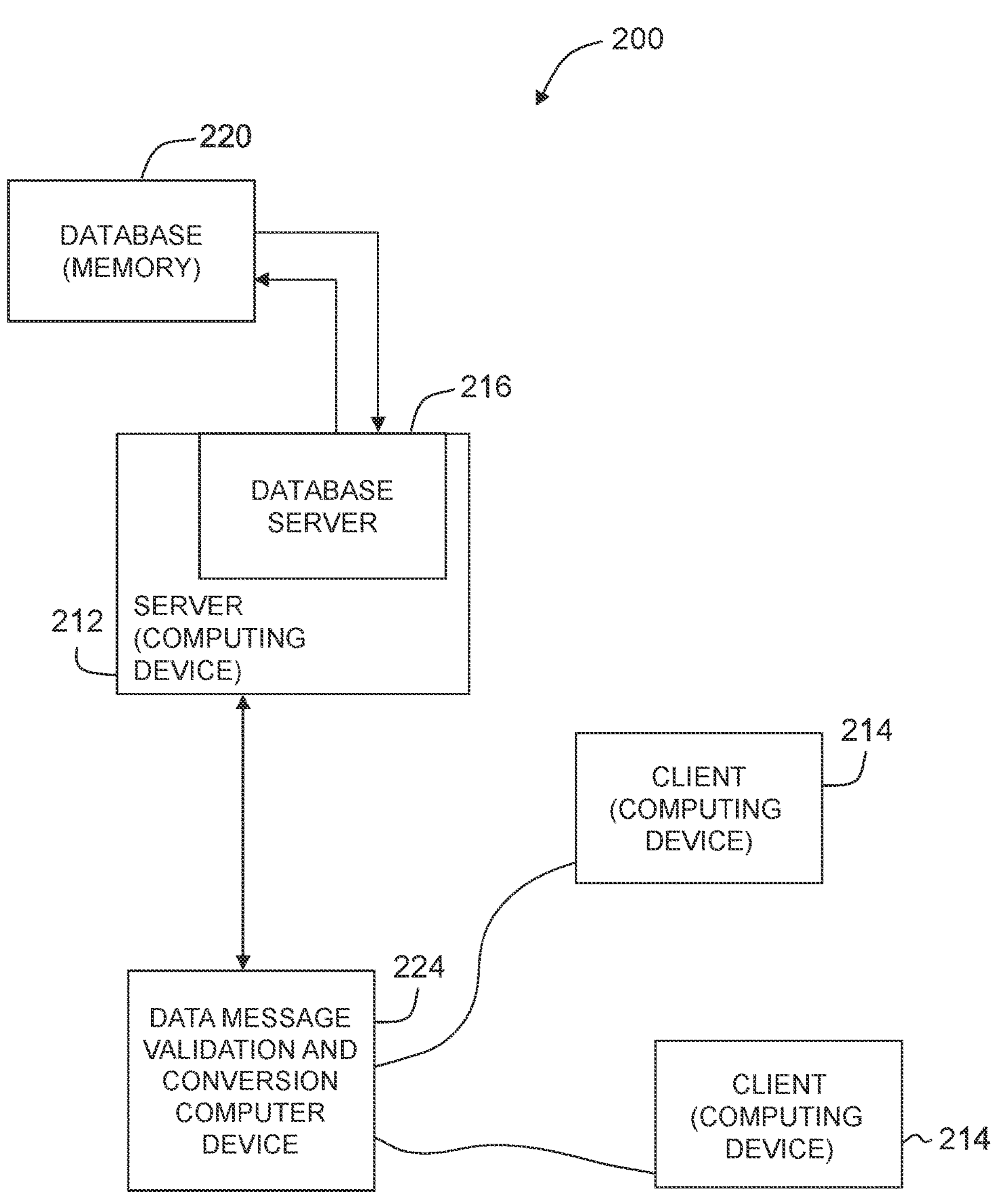

FIG. 2 is a simplified block diagram of an example system 200 used for validating and converting data messages between communication methods in accordance with one example embodiment of the present disclosure. In the example embodiment, system 200 may be used for processing cardholder transactions. In some embodiments, system 200 is a payment processing system that includes a data message validation and conversion ("DMVC") computer device 224 configured to validate and convert data messages between communication methods. In other embodiments, system 200 is a standalone system for testing data messages and includes DMVC computer device 224 to validate and convert test data messages between communication methods. As described below in more detail, DMVC computer device 224 is configured to receive a data message via a first communication protocol, convert the data message to a different communication protocol, and determine if the data message is valid. If the data message is determined to be invalid, DMVC computer device 224 is configured to generate a detailed report about the data message and transmit the detailed report to the originating computer device, and if the data message is determined to be valid, DMVC computer device 224 is configured to transmit the converted data message.

In the example embodiment, client systems 214 (also known as client computing devices) are computers that include a web browser or a software application, which enables client systems 214 to access server system 212 using the Internet. More specifically, client systems 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes content and format rules for multiple different communication protocols, rules for converting messages between the different communication protocols, and a list of setting options sent with each data message by each client system 214 from which DMVC computer device 224 has received data messages from. In the example embodiment, database 220 is stored remotely from server system 212. In some embodiments, database 220 is decentralized.

DMVC computer device 224 is communicatively coupled with server system 212 and client systems 214. DMVC computer device 224 can access server system 212 to store and access data. In some embodiments, DMVC computer device 224 may be associated with, or is part of, payment card system (also referred to as payment processing network) 120, or in may be communication with payment card system 120, shown in FIG. 1. In other embodiments, DMVC computer device 224 is associated with a third party and is merely in communication with payment card system 120. In some embodiments, DMVC computer device 224 may be associated with, or be part of, at least one of merchant bank 126, interchange network 128, and issuer bank 130, all shown in FIG. 1.

In some embodiments, server system 212 may be associated with a financial transaction interchange network 128, shown in FIG. 1, and may be referred to as an interchange computer system. Server system 212 may be used for processing transaction data and analyzing for the transaction data for fraudulent transactions. In addition, at least one of client systems 214 may include a computer system associated with an issuer of a transaction card. Accordingly, server system 212 and client systems 214 may be utilized to process transaction data relating to purchases a cardholder 122 (shown in FIG. 1) makes utilizing a transaction card processed by interchange network 128 and issued by associated issuer 130. At least one client system 214 may be associated with a user or a cardholder seeking to register, access information, or process a transaction with at least one of interchange network 128, issuer 130, or merchant 124. In addition, client systems 214 may include point-of-sale (POS) devices associated with a merchant and used for processing payment transactions. In the example embodiment, client systems 214 may be associated with merchant bank 126 and transmit transactions originating from merchant 124, while server system 212 may be interchange network 128. At least one client system 214 may be used for testing data messages.

Figure 3:
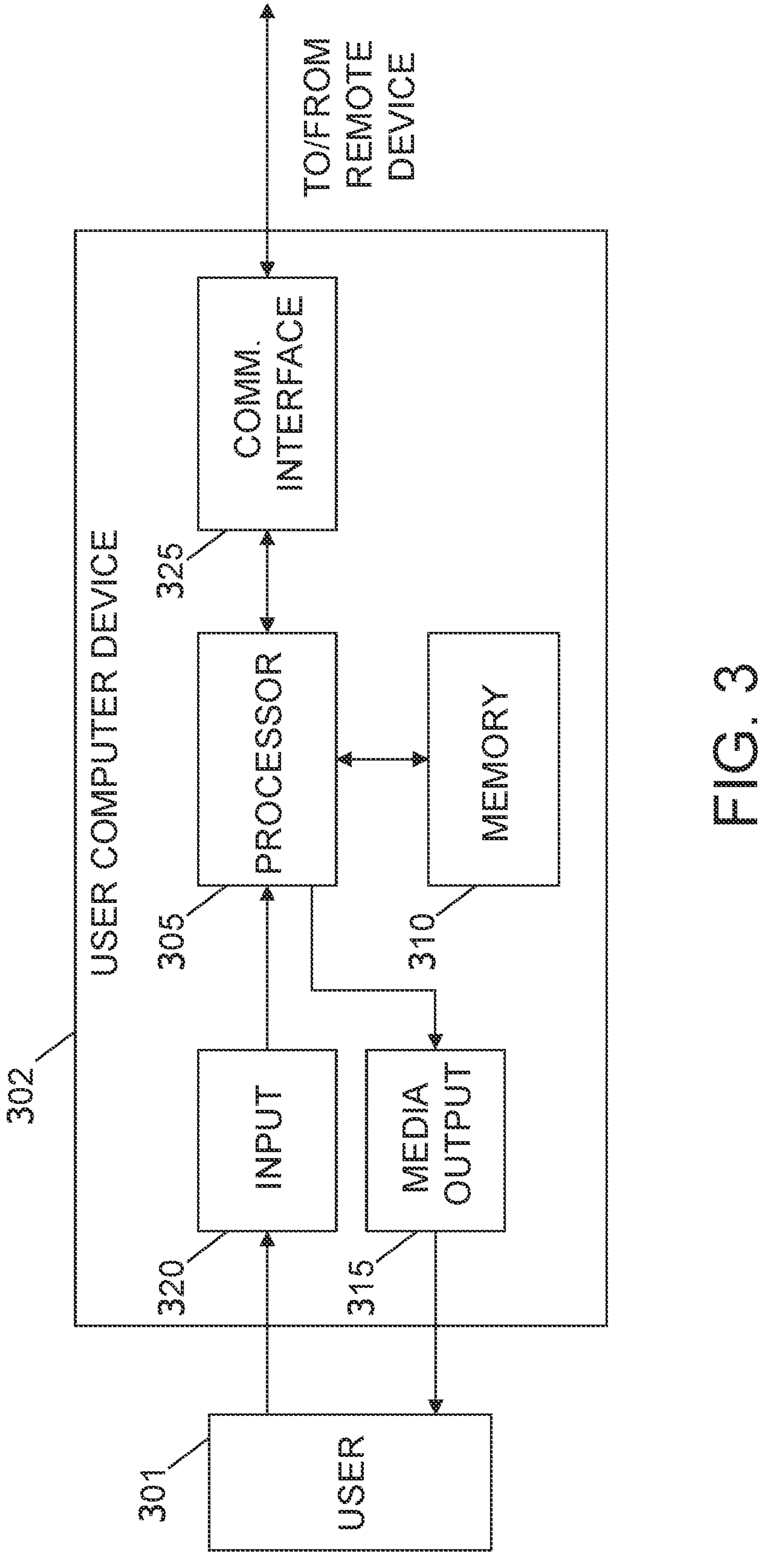

FIG. 3 illustrates an example configuration of client system 214 shown in FIG. 2, in accordance with one embodiment of the present disclosure. User computer device 302 is operated by a user 301. User computer device 302 may include, but is not limited to, client systems 214 and DMVC computer device 224 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. The output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to media output component 315.

Figure 6A:
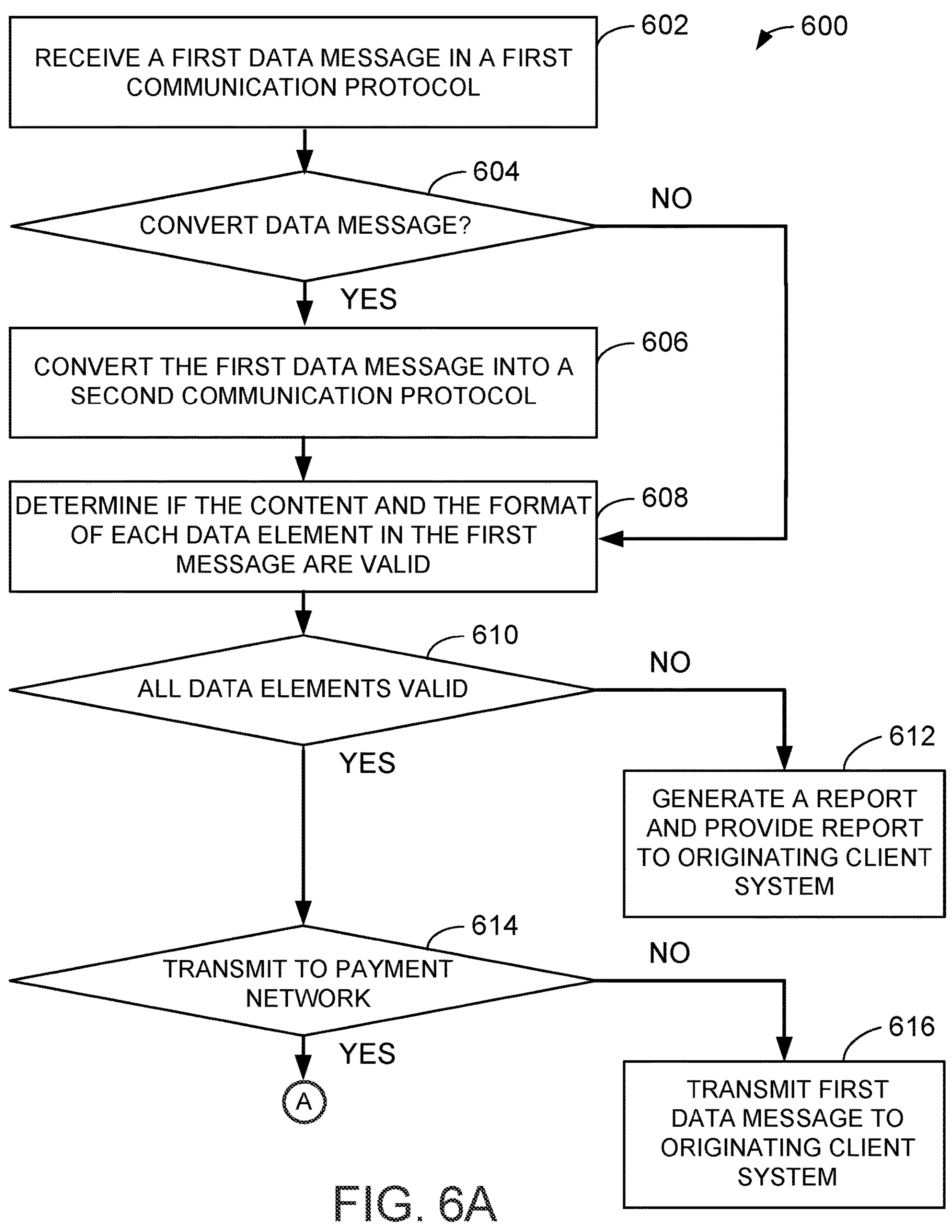
FIGS. 6A and 6B are a flowchart of a process of validating and converting a data message using the system shown in FIG. 2.
Figure 6B:
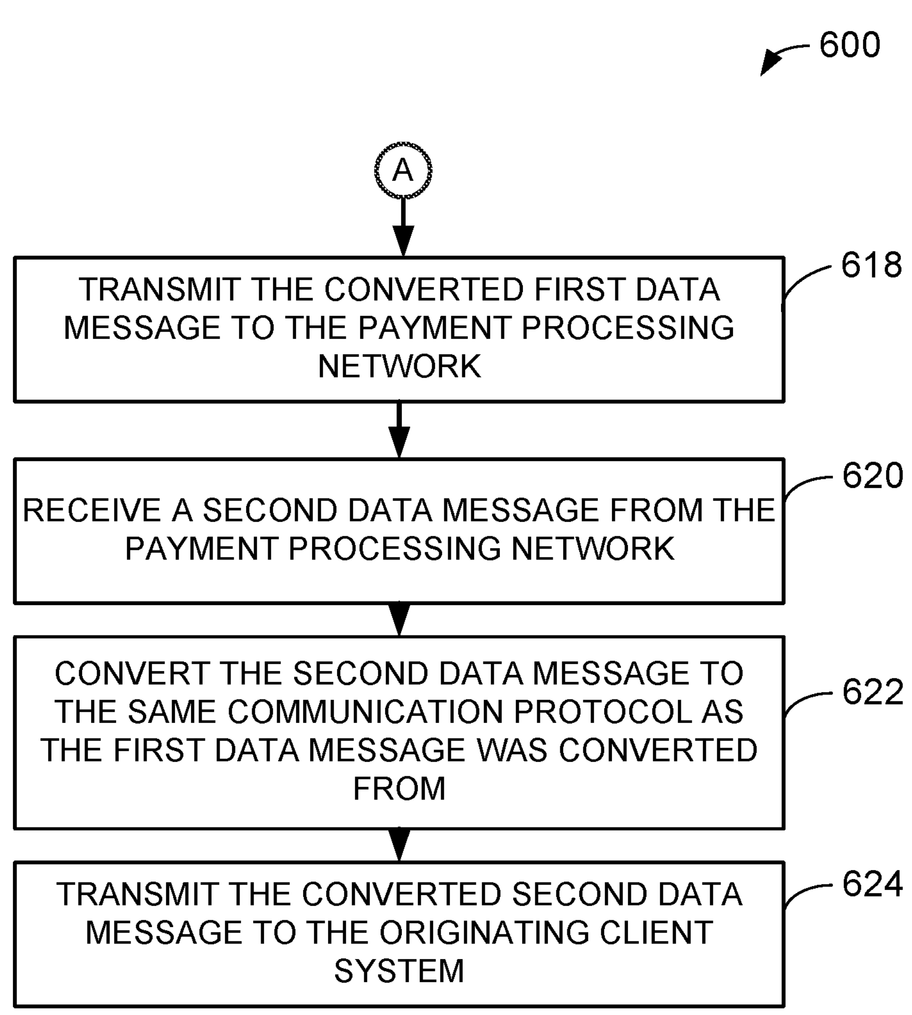

Processor 305 executes computer-executable instructions for implementing aspects of the disclosure. In some embodiments, processor 305 is transformed into a special purpose microprocessor by executing computer-executable instructions or by otherwise being programmed. For example, processor 305 is programmed with instruction such as illustrated in FIGS. 6A and 6B.

Figure 4:
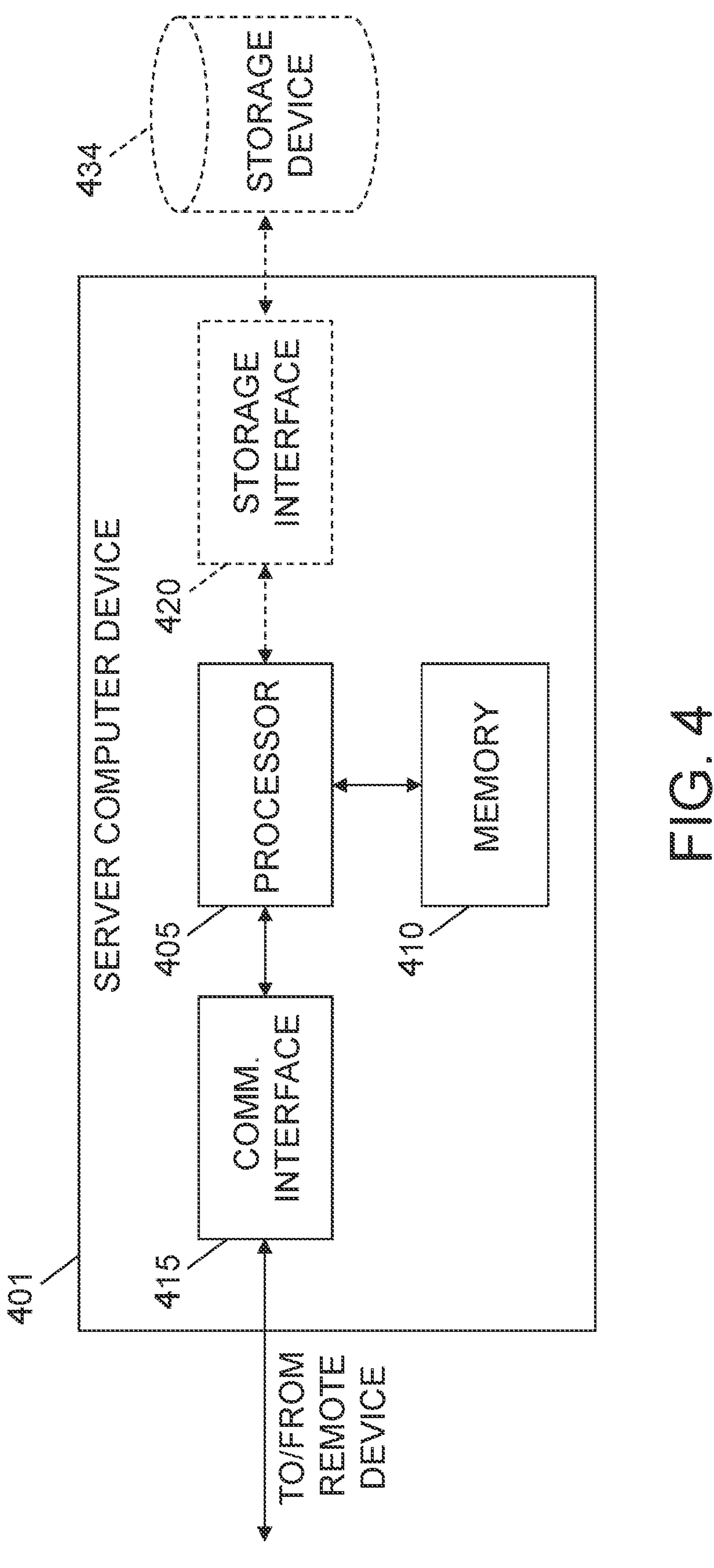

FIG. 4 illustrates an example configuration of server system 212 shown in FIG. 2, in accordance with one embodiment of the present disclosure. Server computer device 401 may include, but is not limited to, server system 212, DMVC computer device 224, and database server 216 (shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214 (shown in FIG. 2), or DMVC computer device 224. For example, communication interface 415 may receive requests from client systems 214, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 5:
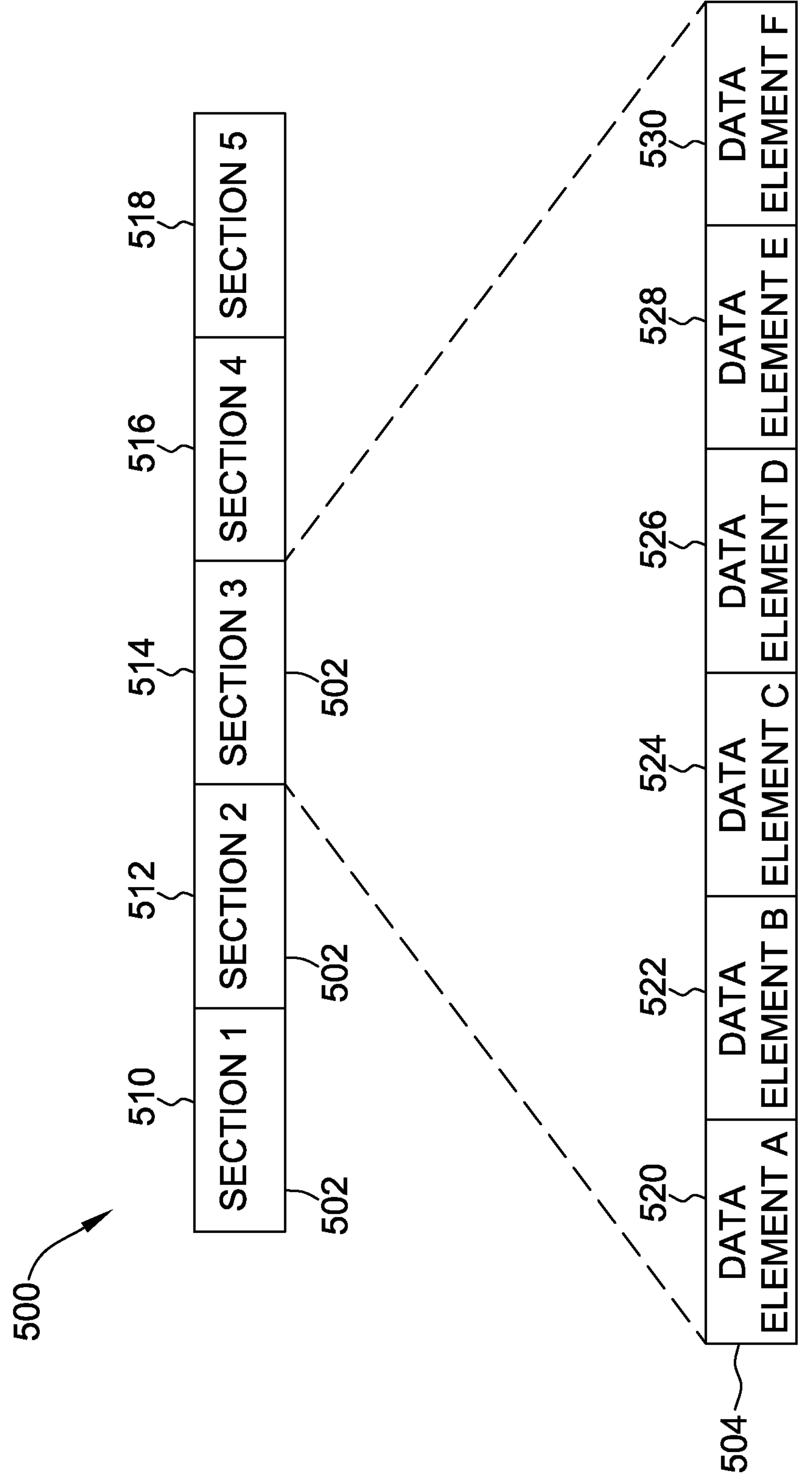

FIG. 5 is a graphical representation of an example data message 500 transmitted and received in system 200 as shown in FIG. 2. Data message 500 is read by computer devices such as DMVC computer device 224 and server system 212 (both shown in FIG. 2). In the example embodiment, data message 500 includes a plurality of sections 502 (i.e. section 1 510, section 2 512, section 3 514, section 4 516, and section 5 518). Each section 502 includes a plurality of data elements 504. For example, section 3 514 includes six data elements 504 (i.e., data element A 520, data element B 522, data element C 524, data element D 526, data element E 528, and data element F 530). In some embodiment, each section 502 includes differing numbers of data elements. For example, section 1 510 may include seven data elements 504, while section 2 512 includes 25 data elements 504. Each data element 504, includes a format and a content. In the example embodiment, the format is the length and the position of data element 504 and the content is the data that data element 504 contains. For example, if data message 500 is an authorization request message for payment system 120 (shown in FIG. 1) then data element A 520 may contain a transaction amount. In this example, the format of data element A 520 may be four bytes long and located at bytes 45 through 48 in an authorization request message. Additionally, the content of data element A 520 may be a signed integer from −2,147,483,647 to 2,147,483,647, where the right-most two digits represent numbers to the right of the decimal point. In another example, the four bytes of transaction amount may be divided up so that the right-most byte may represent an amount to the right of the decimal, while the other three bytes represent the left of the decimal.

In some embodiments, the format and the content of data element 504 may change based on a previous or later data element. For example, data element A 520 may be a transaction amount with four bytes, while data element B 522 may be currency type and only occupy one byte. While one currency type may require data element A 520 to be formatted as three bytes and one byte, for the left and the right of the decimal point respectively, another currency type may require data element A 520 to be formatted as four bytes, or as 1 bit, 24 bits, and 7 bits.

Additionally, the content of data element 504 may indicate if another data element 504 is used. For example, data element D 526 may be a country code and element E 528 may be a postal code for originating merchant 124 (shown in FIG. 1). In some countries such as Ireland, postal codes are not used. When DMVC computer device 224 reads data element D 526, DMVC computer device 224 may determine that the contents of data element D 526 represent the country of Ireland. In the example embodiment, data element D 526 contains a number. DMVC computer device 224 compares the number in data element D 526 to a list of country codes stored in database 220 (shown in FIG. 2) and determines that the number in data element D 526 represents the country of Ireland. DMVC computer device 224 confirms that data element E 528 is empty (i.e., filled with zeros).

In the example embodiment, data elements 504 may have different formats and content requirements in different communication protocols. For example, in a first communication protocol, transaction amount and currency type are located in data element A 520, and data element B 522, respectively. In a second communication protocol, data element A 520 may contain currency amount, and data element B may contain transaction amount. In a third communication protocol, transaction amount may be stored in a data element 504 in section 2 512, while currency type is stored in data element C 524 in section 3 514. Additionally, the size of data elements 504 for the same item may change between communication protocols. For example, currency type may be one byte long in a first communication protocol, two bytes long in a second communication protocol, and seven bits long in a third communication protocol. In the example embodiment, different communication protocols may include, but are not limited to, American Standard Code for Information Interchange (ASCII), Web Services Description Language Extensible Markup Language (WSDL XML), Extended Binary Coded Decimal Interchange Code (EBCDIC) Binary, HyperText Markup Language (HTML), and JavaScript Object Notation (JSON).

FIGS. 6A and 6B are a flowchart of a process 600 of validating and converting a data message using system 200 shown in FIG. 2. In the example embodiment, process 600 is performed by DMVC computer device 224 (shown in FIG. 2).

DMVC computer device 224 receives 602 a first data message in first communication protocol. In the example embodiment, the first data message includes a plurality of data elements 504 (shown in FIG. 5) and at least one setting option. In the example embodiment, the at least one setting option includes the communication protocol that the data message is received in, the communication protocol that the data message is to be converted to, and where the converted and validated data message is to be transmitted to. In the example embodiment, DMVC computer device 224 receives 602 the first data message from client system 214 (shown in FIG. 2), where first data message originated from merchant 124 (shown in FIG. 2). DMVC computer device 224 determines 604 whether to convert the first data message to a second communication protocol based on the at least one setting option. If the determination is yes, DMVC computer device 224 converts 606 the first data message into the second communication protocol based on the at least one setting option. If the determination is no, DMVC computer device 224 skips the conversion step 606 and proceeds to Step 608. DMVC computer device 224 determines 608 if the format and the content of each data element 504 in the first data message are valid. DMVC computer device 224 determines 608 if the first data message is valid by comparing the format and the content of each of data elements 504 in the first data message to rules for proper format and content of the corresponding communication protocol stored in database 220 (shown in FIG. 2).

If DMVC computer device 224 determines that one or more data elements 504 are invalid, DMVC computer device 224 marks those data elements as invalid. Following the example in FIG. 5, if DMVC computer device 224 determines that the number in data element D 526 (shown in FIG. 5) represents the United States of America, DMVC computer device 224 analyzes data element E 528 (shown in FIG. 5) to determine if data element E 528 is properly formatted for a ZIP+4 code. Additionally, DMVC computer device 224 analyzes the content of the resulting ZIP+4 code to determine if it matches the address of merchant 124. The address of merchant 124 may be retrieved from database 220 or may be based on the address data transmitted in other data elements 504 of the first data message.

DMVC computer device 224 checks 610 if any data elements 504 are marked as invalid. If at least one data element 504 is marked invalid, DMVC generates 612 a detailed report about invalid data elements 504 and provides the report to originating client system 214. In some embodiments, the report is transmitted to the originating client system 214; in other embodiments, the report is transmitted to a different client system 214, such as via an e-mail to merchant bank 126. In the example embodiment, the report is generated to provide verbose debugging information about the invalid data elements 504. For example, the report may contain a listing of all of data elements 504 included in data message 500, an indication of each invalid data element, and detailed information about the proper format and content for the invalid data elements. Detailed information about the proper format and content may be stored in database 220 for each potential data message 500. In some embodiments, the report may contain corrected content for invalid data elements 504 or examples.

If none of the data elements 504 are invalid, DMVC computer device 224 determines 614 where to transmit the first data message based on the at least one setting option. In the example embodiment, DMVC computer device 224 determines 614 whether or not to transmit the first data message to a part of payment card system 120, such as interchange network 128 (shown in FIG. 1). If the determination is no, then DMVC computer device 224 transmits 616 the first data message to client system 214 that originally sent first data message. If the determination is yes, DMVC computer device 224 transmits 618 the converted first data message to the desired part of payment card system 120, for example interchange network 128. DMVC computer device 224 receives 620 a second data message from payment card system 120 in response to the first data message. DMVC computer device 224 converts 622 the second data message to the communication protocol that client system 214 desires based on the at least one setting option. DMVC computer device 224 transmits 624 the converted second data message to originating client system 214.

In the example embodiment, the first data message is an authorization request message transmitted by merchant bank 126 and originating from merchant 124 for a transaction conducted with cardholder 122. DMVC computer device 224 transmits the first data message to server system 212, which is a part of interchange network 128. The second data message is an authorization response message transmitted by server system 212 from interchange network 128 in response to the authorization request message.

In the example embodiment, DMVC computer device 224 converts 606 the first data message before determining 608 if the format and the content of each data element 504 are valid. However, in other embodiments, DMVC computer device 224 converts 606 the first data message after checking 610 that none of data elements 504 in the first data message are invalid. In these other embodiments, the conversion may be done at a later step to ensure that the plurality of data elements 504 in the first data message are valid. In the example embodiment, performing the converting 606 step done before the determining 608 step allows DMVC computer device 224 to determine whether the plurality of data elements 504 in the first data message were in the proper format and content to allow for conversion to the second communication protocol.

In some other embodiments, DMVC computer device 224 receives the first data message in a first communication protocol from client system 214. DMVC computer device 224 converts the first data message to a different communication protocol. DMVC computer device 224 validates the converted first data message. DMVC computer device 224 transmits the converted first data message to client system 214. In some embodiments, DMVC computer device 224 also generates and transmits a detailed report about the conversion and validation of the first data message to client system 214.

In some embodiments, DMVC computer device 224 is configured to receive individual data elements 504 or a subset of the data elements in data message 500 for validation and or/conversion. For example, DMVC computer device 224 may receive a data message 500 containing a single data element 504 and information indicating where in data message 500 that data element 504 is located from client system 214. DMVC computer device 224 uses the stored rules about the proper format and content for that data element 504 to validate the received data element 504. DMVC computer device 224 generates a detailed and verbose report about the received data element 504 and transmits the detailed and verbose report to client system 214. In some embodiments, the individual data element 504 or the partial data message 500 is converted to a different communication protocol and transmitted to client system 214.

Figure 7:
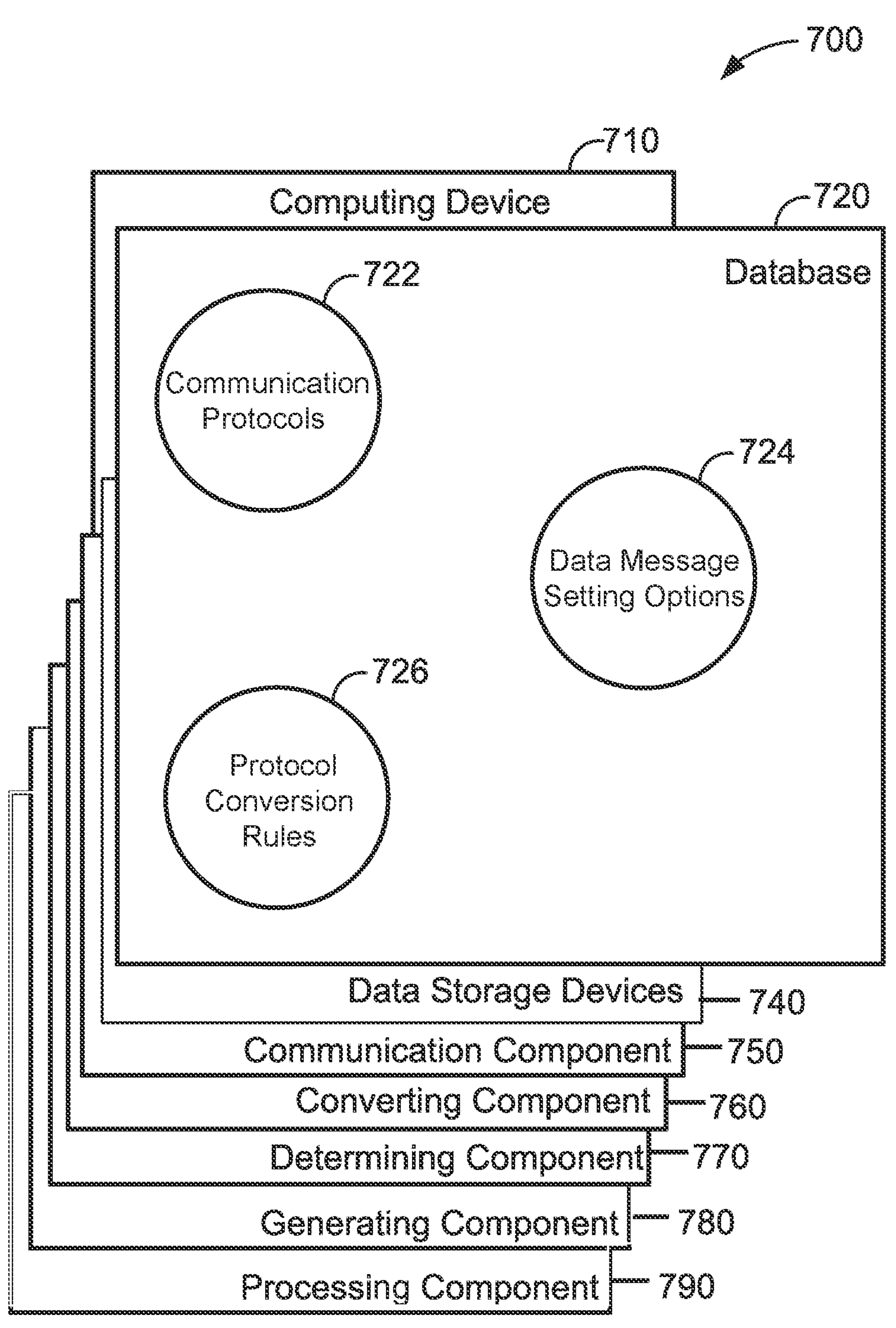

FIG. 7 is a diagram 700 of components of one or more example computing devices that may be used in system 200 shown in FIG. 2. In some embodiments, computing device 710 is similar to server system 212; computing device 710 may also be similar to DMVC computer device 224 (both shown in FIG. 2). Database 720 may be coupled with several separate components within computing device 710, which perform specific tasks. In this embodiment, database 720 includes communication protocols 722, data message setting option 724, and protocol conversion rules 726 for converting between the different communication protocols. In some embodiments, database 720 is similar to database 220 (shown in FIG. 2).

Computing device 710 includes database 720 as well as data storage devices 740. Computing device 710 also includes a communication component 750 for receiving 602 a first data message, generating 612 a report, transmitting 616 the first data message to originating client system, transmitting 618 the converted first data message to the payment processing network, receiving 620 a second data message from the payment processing network, and transmitting 624 a converted second data message, all shown in FIGS. 6A and B. Computing device 710 also includes a converting component 760 for converting 606 the first data message (shown in FIG. 6A) and converting 622 the second data message, shown in FIG. 6B. Computing device 710 further includes a determining component 770 for determining 608 if the content and format of each data element in the first data message are valid, as shown in FIG. 6A. Moreover, computing device 710 includes a generating component 780 for generating 612 a report, as shown in FIG. 6A. A processing component 790 assists with execution of computer-executable instructions associated with the system.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A computer device for validating and converting computer data messages in different communication formats, the computer device comprising at least one processor communicatively coupled to at least one memory device, the at least one processor configured to:

receive from a plurality of client computer devices a plurality of data messages, wherein each of the received plurality of data messages includes (i) a plurality of data elements of an authorization request message and (ii) at least one setting option, wherein each of the plurality of data elements includes a format defined by a byte-size of that data element and a byte-location of that data element across the corresponding data message, and wherein the at least one setting option in each data message specifies: (i) a first communication protocol that the data message is currently in, (ii) a second communication protocol that the data message is to be converted into, and (iii) a destination for the data message after conversion;

determine, for each received data message, that a first byte-size and a first byte-location of one or more data elements of that received data message correspond to the first communication protocol by comparing (i) at least one stored first byte-size and at least one stored first byte-location in a database for the first communication protocol to (ii) the first byte-size and the first byte-location of each received data message;

retrieve, from the database for each received data message, at least one stored second byte-size and at least one stored second byte-location corresponding to the second communication protocol specified by the at least one setting option included in that received data message;

generate a new data message for each received data message by repositioning within each new data message at least one of the first byte-size or the first byte-location of the first communication protocol into at least one of a second byte-size corresponding to the at least one stored second byte-size and a second byte-location corresponding to the at least one stored second byte-location, thereby converting each received data message into the second communication protocol;

determine validity of each of the plurality of data elements in each converted new data message by comparing (i) a format of each data element in each converted new data message to rules for proper format corresponding to the second communication protocol and (ii) a content of each data element in each converted new data message to a stored content in the database; and for each converted new data message:

if the determination is that at least one of the content or the format of at least one of the plurality of data elements is invalid after conversion to the second communication protocol, execute debugging operations including: (i) marking the at least one data element as invalid, (ii) identifying at least one of the invalid content or the invalid format of the at least one data element, (iii) generating computer-executable debugging instructions to correct at least one of the identified invalid content or the identified invalid format, (iv) generating a report listing at least one of the identified invalid content or the identified invalid format, and the debugging instructions, and (v) transmitting the report to one of the plurality of client computer devices that transmitted the received data message, thereby reducing time required to debug the plurality of data elements of the converted new data message and reducing time required to convert the by providing (i) identification of at least one of the invalid content or the invalid format and (ii) the debugging instructions to correct at least one of the identified invalid content or the identified invalid format; and if the determination is that the format and the content of the plurality of data elements is valid after conversion to the second communication protocol, transmit the converted new data message to the destination identified by the at least one setting option included in the received data message.

2. The computer device of claim 1, wherein the at least one setting option is configured to instruct the computer device how to process the received data message including the at least one setting option.

3. The computer device of claim 1, wherein the plurality of data elements and the at least one setting option constitute separate parts of each received data message.

4. The computer device of claim 1, wherein the at least one processor is further configured to read the content of each of the plurality of data elements based on at least one of the byte-size and the byte-location corresponding to the first communication protocol.

5. The computer device of claim 1, wherein the destination is a processing network, and wherein the second communication protocol enables communication between the computer device and the processing network.

6. The computer device of claim 1, wherein the destination is a client computer device of the plurality of client computer devices.

7. The computer device of claim 1, wherein the at least one processor is further configured to:

store a plurality of format and content information for a plurality of additional data elements;

compare each data element in a converted new data message to the plurality of format and content information to determine whether the format and the content of each data element in the converted new data message is valid; and mark as invalid each data element in the converted new data message that includes at least one of the format or the content determined to be invalid.

8. A computer-implemented method for validating and converting computer data messages in different communication formats, the method implemented using a computer device including at least one processor communicatively coupled to at least one memory device, the method comprising:

receiving from a plurality of client computer devices a plurality of data messages, wherein each of the received plurality of data messages includes (i) a plurality of data elements of an authorization request message and (ii) at least one setting option, wherein each of the plurality of data elements includes a format defined by a byte-size of that data element and a byte-location of that data element across the corresponding data message, and wherein the at least one setting option in each data message specifies: (i) a first communication protocol that the data message is currently in, (ii) a second communication protocol that the data message is to be converted into, and (iii) a destination for the data message after conversion;

determining, for each received data message, that a first byte-size and a first byte-location of one or more data elements of that received data message correspond to the first communication protocol by comparing (i) at least stored first byte-size and at least one stored first byte-location in a database for the first communication protocol to (ii) the first byte-size and the first byte-location of each received data message retrieving from the database for each received data message, at least stored second byte-size and at least one stored second byte-location corresponding to the second communication protocol specified by the at least one setting option included in that received data message;

generating a new data message for each received data message by repositioning within each new data message at least one of the first byte-size or the first byte-location of the first communication protocol into at least one of a second byte-size corresponding to the at least one stored second byte-size and a second byte-location corresponding to the at least one stored second byte-location, thereby converting each received data message into the second communication protocol;

determining the validity each of the plurality of data elements in each converted new data message by comparing (i) a format of each data element in each converted new data message to rules for proper format corresponding to the second communication protocol and (ii) a content of each data element in each converted new data message to a stored content in the database; and for each converted new data message:

if the determination is that at least one of the content or the format of at least one of the plurality of data elements is invalid after conversion to the second communication protocol, executing debugging operations comprising: (i) marking the at least one data element as invalid, (ii) identifying at least one of the invalid content or the invalid format of the at least one data element, (iii) generating computer-executable debugging instructions to correct at least one of the identified invalid content or the identified invalid format, (iv) generating a report listing at least one of the identified invalid content or the identified invalid format, and the debugging instructions, and (v) transmitting the report to one of the plurality of client computer devices that transmitted the received data message, thereby reducing time required to debug the plurality of data elements of the converted new data message by providing (i) identification of at least one of the invalid content or the invalid format and (ii) the debugging instructions to correct at least one of the identified invalid content or the identified invalid format; and if the determination is that the format and the content of the plurality of data elements is valid after conversion to the second communication protocol, transmitting the converted new data message to the destination identified by the at least one setting option included in the received data message.

9. The computer-implemented method of claim 8, wherein the at least one setting option is configured to instruct the computer device how to process the received data message including the at least one setting option.

10. The computer-implemented method of claim 8, wherein the plurality of data elements and the at least one setting option constitute separate parts of each received data message.

11. The computer-implemented method of claim 8 further comprising reading the content of each of the plurality of data elements based on at least one of the byte-size and the byte-location corresponding to the first communication protocol.

12. The computer-implemented method of claim 8, wherein the destination is a processing network, and wherein the second communication protocol enables communication between the computer device and the processing network.

13. The computer-implemented method of claim 8, wherein the destination is a client computer device of the plurality of client computer devices.

14. The computer-implemented method of claim 8 further comprising:

storing a plurality of format and content information for a plurality of additional data elements;

comparing each data element in a converted new data message to the plurality of format and content information to determine whether the format and the content of each data element in the converted new data message is valid; and marking as invalid each data element in the converted new data message that includes at least one of the format or the content determined to be invalid.

15. At least one non-transitory computer-readable storage medium having computer-executable instructions embodied thereon, wherein when executed by a computer device having at least one processor coupled to at least one memory device, the computer-executable instructions cause the at least one processor to:

receive from a plurality of client computer devices a plurality of data messages, wherein each of the received plurality of data messages includes (i) a plurality of data elements of an authorization request message and (ii) at least one setting option, wherein each of the plurality of data elements includes a format defined by a byte-size of that data element and a byte-location of that data element across the corresponding data message, and wherein the at least one setting option in each data message specifies (i) a first communication protocol that the data message is currently in, (ii) a second communication protocol that the data message is to be converted into, and (iii) a destination for the data message after conversion;

determine, for each received data message, that a first byte-size and a first byte-location of one or more data elements of that received data message correspond to the first communication protocol by comparing (i) at least one stored first byte-size and at least one stored first byte-location in a database for the first communication protocol to (ii) the first byte-size and the first byte-location of each received data message;

retrieve from the database for each received data message, at least one stored second byte-size and at least one stored second byte-location corresponding to the second communication protocol specified by the at least one setting option included in that received data message;

generate a new data message for each received data message by repositioning within each new data message at least one of the first byte-size or the first byte-location of the first communication protocol into at least one of a second byte-size corresponding to the at least one stored second byte-size and a second byte-location corresponding to the at least one stored second byte-location, thereby converting each received data message into the second communication protocol;

determine validity of each of the plurality of data elements in each converted new data message by comparing (i) a format of each data element in each converted new data message to rules for proper format and content corresponding to the second communication protocol and (ii) a content of each data element in each converted new data message to a stored content in the database; and for each converted new data message:

if the determination is that at least one of the content or the format of at least one of the plurality of data elements is invalid after conversion to the second communication protocol, execute debugging operations including: (i) marking the at least one data element as invalid, (ii) identifying at least one of the invalid content or the invalid format of the at least one data element, (iii) generating computer-executable debugging instructions to correct at least one of the identified invalid content or the identified invalid format, (iv) generating a report listing at least one of the identified invalid content or the identified invalid format, and the debugging instructions, and (v) transmitting the report to one of the plurality of client computer devices that transmitted the received data message, thereby reducing time required to debug the plurality of data elements of the converted new data message by providing (i) identification of at least one of the invalid content or the invalid format and (ii) the debugging instructions to correct at least one of the identified invalid content or the identified invalid format; and if the determination is that the format and the content of the plurality of data elements is valid after conversion to the second communication protocol, transmit the converted new data message to the destination identified by the at least one setting option included in the received data message.

16. The at least one non-transitory computer-readable storage medium of claim 15, wherein the at least one setting option is configured to instruct the computer device how to process the received data message including the at least one setting option.

17. The at least one non-transitory computer-readable storage medium of claim 15, wherein the plurality of data elements and the at least one setting option constitute separate parts of each received data message.

18. The at least one non-transitory computer-readable storage medium of claim 15, wherein the computer-executable instructions further cause the at least one processor to read the content of each of the plurality of data elements based on at least one of the byte-size and the byte-location corresponding to the first communication protocol.

19. The at least one non-transitory computer-readable storage medium of claim 15, wherein the destination is a processing network, and wherein the second communication protocol enables communication between the computer device and the processing network.

20. The at least one non-transitory computer-readable storage medium of claim 15, wherein the computer-executable instructions further cause the at least one processor to:

store a plurality of format and content information for a plurality of additional data elements;

compare each data element in a converted new data message to the plurality of format and content information to determine whether the format and the content of each data element in the converted new data message is valid; and mark as invalid each data element in the converted new data message that includes at least one of the format or the content determined to be invalid.

* * * * *